United States Patent [19]
Gold

[11] Patent Number: 5,842,770
[45] Date of Patent: *Dec. 1, 1998

[54] VAN REAR DOOR DISPLAY FOR TWO WAY TRAFFIC

[76] Inventor: Peter Gold, 465 N. Wood Rd., Rockville Centre, N.Y. 11570

[ * ] Notice: The term of this patent shall not extend beyond the expiration date of Pat. No. 5,613,755.

[21] Appl. No.: 979,919

[22] Filed: Nov. 21, 1997

[51] Int. Cl.⁶ .................................................. B60Q 1/26
[52] U.S. Cl. .......................... 362/80; 362/83.3; 340/471; 340/472
[58] Field of Search ........................... 362/80, 83.3, 249, 362/252, 61, 253, 234; 340/469, 472, 473, 470

[56] References Cited

U.S. PATENT DOCUMENTS

| | | | |
|---|---|---|---|
| 3,175,186 | 3/1965 | Barenyi | 362/80 |
| 5,193,895 | 3/1993 | Naruke et al. | 362/80 |
| 5,613,755 | 3/1997 | Gold | 362/80 |
| 5,711,593 | 1/1998 | Gold | 362/80 |

*Primary Examiner*—Thomas M. Sember
*Attorney, Agent, or Firm*—Myron Amer PC

[57] ABSTRACT

Taillights are located adjacent the hinge axis of, and on van right and left doors, so that a closed door displays the taillight to traffic approaching the van from the rear. Also after a door pivotal traverse into an open condition there is a display of the taillight to traffic approaching the van from the front.

1 Claim, 1 Drawing Sheet

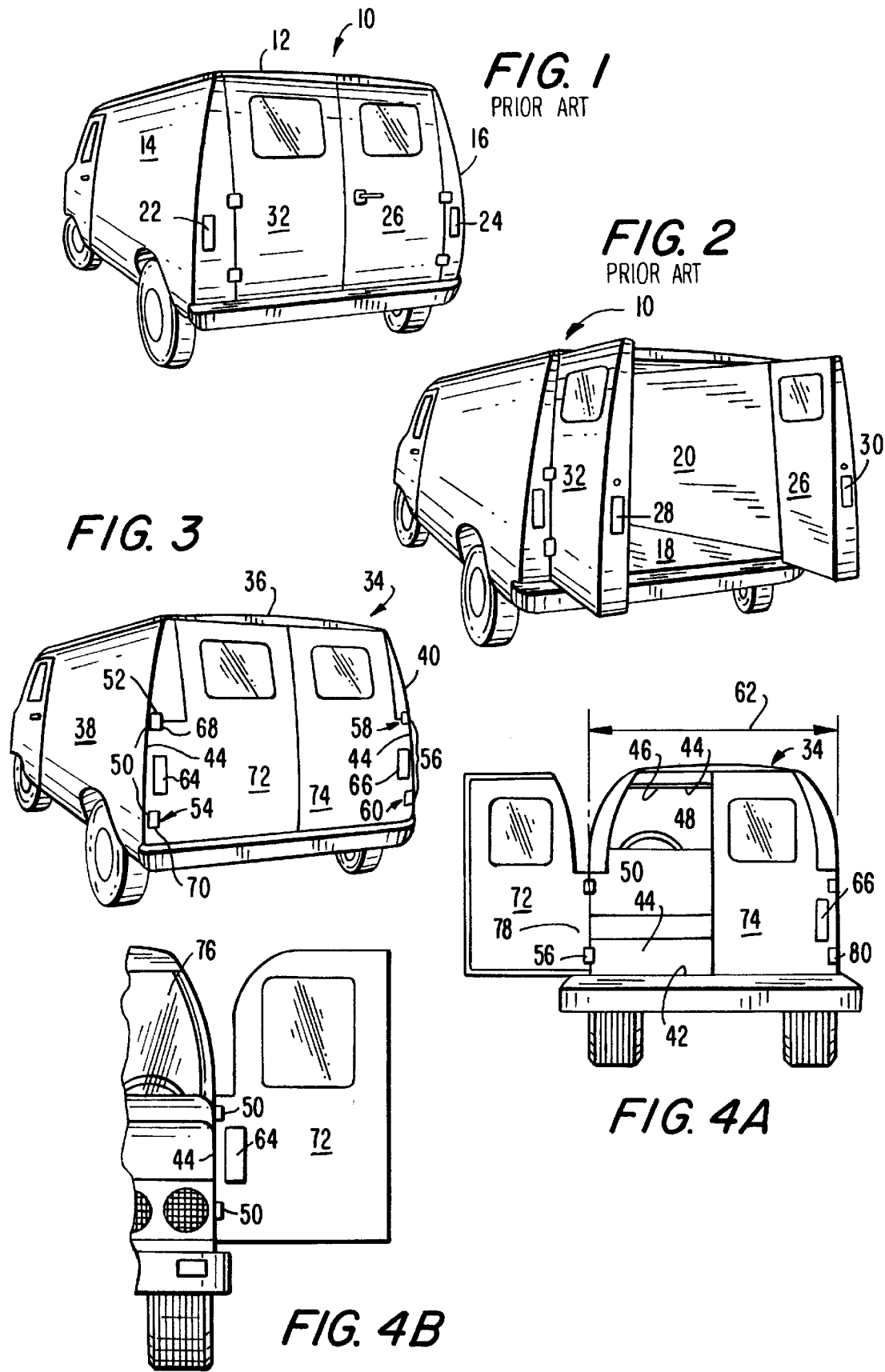

VAN REAR DOOR DISPLAY FOR TWO WAY TRAFFIC

The present invention relates generally to light display improvements applied to rear doors of a van, said improvements positioning the light display so that it is seen by motorists approaching the van both from the front or from the rear, as well as providing other benefits.

EXAMPLES OF THE PRIOR ART

The problem of van rear taillights being blocked from view to approaching motorists is well known since a van is typically parked, preparatory to loading and unloading, alongside the stream of traffic. U.S. Pat. No. 3,582,639 for "Emergency Signal Light for Automobile" issued to John R. Chamberlain on Jun. 1, 1971 is exemplary of many prior art patents which illustrate and describe additional tail or rear lights to signal the presence of a vehicle to an oncoming motorist, the additional light of the '639 patent being located on an automobile trunk lid and assuming its intended display position when the trunk lid is raised incident to obtaining access to the trunk. The utility claimed for the '639 rear light improvement is somewhat lessened by the user's location in front of the trunk and thus between the rear light and an oncoming motorist which necessarily blocks some of the rear light from view.

In U.S. Pat. No. 5,193,895 for "Warning Light" issued to Naoki Naruke et al. on Mar. 16, 1993, there is a more pertinent disclosure in FIG. 11 of a van, as distinguished from a sedan type vehicle, having a light on a bottom edge of an open lid of a known hatchback rear closure, which contributes to safer use but also necessarily results in the user's position blocking out some of the rear light display.

Broadly, it is an object of the present invention to provide a positionable tail or rear light display of a van to overcome the foregoing and other shortcomings of the prior art.

More particularly, it is an object to use two positions of the light display to mark the presence of the van respectively to traffic approaching the van from the front (i.e., one light display position) and the traffic approaching the van from the rear (i.e., the other light display position), as well as providing as a benefit a wider rear opening into the van passenger and cargo space, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a rear perspective view of a van having a prior art taillight display;

FIG. 2 is similarly a rear perspective view of the van of FIG. 1, but illustrating the rear doors in an open condition;

FIG. 3 is a rear perspective view of a van having a taillight display according to the present invention;

FIG. 4A is a rear view of the van of FIG. 3 with a rear door in an open condition as seen by a motorist approaching the van from the rear; and FIG. 4B is a partial rear view similar to FIG. 4A, but as seen by a motorist approaching the van from the front.

The prior art van of FIGS. 1, 2, generally designated 10, has a top 12, left side 14, right side 16 and floor 18 cooperating to bound an internal compartment 20 for passengers and cargo (not shown). Standard equipment also includes left taillight 22 and right taillight 24 which when illuminated provide a light display to a motorist approaching the van 10 from the rear. A shortcoming of the traditionally located taillights 22 and 24 is that in the FIG. 2 open condition of a door, as exemplified by the right door 26, the right taillight 24 is blocked by the open right door 26 from view to an approaching motorist, and thus one effort to negate this shortcoming is to provide additional taillights 28 and 30 on the right door 26 and on the left door 32. These efforts are exemplified by prior patents issued to Peter Gold such as U.S. Pat. No. 5,523,926 for "Industrial Van" issued on Jun. 4, 1996, U.S. Pat. No. 5,668,530 for "Van Rear Three-Light Display" on Sep. 16, 1997, U.S. Pat. No. 5,560,702 for "Van Rear Light Display" issued on Oct. 1, 1996, and U.S. Pat. No. 5,613,755 for "Rear Door Van Lights" issued on Mar. 25, 1997.

In accordance with the present invention an enhanced van rear door light display is embodied in the van construction and operational mode and, in addition, the van is provided with a desirable wider rear opening into the van cargo and passenger compartment 20. To these ends, the inventive van, generally designated 34, is also constructed with a top 36, left side 38, right side 40, and floor 42, each having a rearward edge, individually and collectively designated 44, which bound a rear opening 46 into a compartment 48 bounded by the top 36, sides 38, 40, and floor 42. Differing from van 10, van 34 has left hinge means 50 located on the left side edge 44, at locations 52 and 54, and right hinge means 56 located on the right side edge 44, at locations 58 and 60, such that the possible useable width 62 of rear opening 46 extends fully from left side edge 44 to right side edge 44.

Left taillight 64 and right taillight 66 are respectively located, as at 68 and 70, inboard of the hinge means 50 and 56 on a left and right door 72 and 74 and in these inboard positions the taillights 64, 66 are readily in view to a motorist approaching from the rear the van 34 either in motion or parked preparatory to a loading and unloading activity. In the FIG. 4A van condition, an internal light in the compartment 48 is recommended (not shown) to signal an approaching motorist if both the left and right doors 72 and 74 are open.

With a known, commercially available hinge means selected to allow a 180 degree pivotal traverse, an open door, as exemplified by the left door 72 of FIG. 4A repositions its taillight 64 to a position outboard of the hinge means 50 and 56, and such outboard position locates taillight 64 so that it is readily in view to a motorist approaching van 34 from the front. In addition to taillights 64 and 66 positionable so as to be seen from the front, it is recommended that an internal compartment light, not shown, be used that is also seen by an approaching motorist through the van windshield 76.

The wider rear opening 46 facilitates the loading and unloading of the compartment 48 of a parked van 34, and there is also used door edge panels 78 and 80 which contribute to the making of the wider rear opening 46 as locations for the taillights 64 and 66 so that these taillights are repositioned in facing relation to a motorist approaching the van 34 from the front upon an opening of a rear van door 72, 74, to correspondingly provide a light display to an approaching motorist marking the presence of the van 34 as a possible traffic hazard.

While the van rear door display herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Positionable van rear door taillights for providing a light display for traffic approaching both from the rear and from the front of a parked van during the loading and unloading thereof, said taillights comprising a van top, left side, right side and floor cooperating to bound a van internal compartment for passengers and cargo, rearwardly disposed edges on said top, left side, right side and floor cooperating to bound an opening into said compartment, left hinge means and right hinge means disposed respectively on said compartment opening left edge and on said compartment opening right edge, a left door and a right door disposed respectively on said left hinge means and on said right hinge means so as to be adapted to partake of a pivotal traverse of at least 180 degrees in movement from a position closing said compartment opening to a clearance position opening said compartment opening, and a left and right taillight disposed respectively in positions inboard of said hinge means of said left door and of said hinge means of said right door, whereby in said inboard taillight positions as when said left and right doors are in a closed condition said taillights are visible to traffic approaching said van from the rear and said taillights are positioned outboard of said hinge means as when said left and right doors are in an open condition during a loading and unloading of said van and are visible to traffic approaching said van from the front.

* * * * *